(No Model.) 7 Sheets—Sheet 1.

T. B. HARRISON & J. W. MARTIN.
MACHINE FOR MAKING WIRE AND PICKET FENCING.

No. 299,471. Patented May 27, 1884.

Witnesses
C. W. H. Brown
Philip Hawley

Inventors
Jerome W. Martin
Thomas B. Harrison
By Wallace A. Bartlett
Atty.

(No Model.) 7 Sheets—Sheet 2.

T. B. HARRISON & J. W. MARTIN.
MACHINE FOR MAKING WIRE AND PICKET FENCING.

No. 299,471. Patented May 27, 1884.

Witnesses.
C. W. Brown,
Philip Hawley.

Jerome W. Martin
Thomas B. Harrison
Inventors.
By Wallace A. Bartlett
Atty.

(No Model.) 7 Sheets—Sheet 3.

T. B. HARRISON & J. W. MARTIN.
MACHINE FOR MAKING WIRE AND PICKET FENCING.

No. 299,471. Patented May 27, 1884.

Witnesses.
C. W. Brown
Philip Hawley

Inventors.
Jerome W. Martin
Thomas B. Harrison
By Wallace A. Bartlett
Atty.

N. PETERS, Photo-Lithographer, Washington, D. C.

(No Model.) 7 Sheets—Sheet 5.

T. B. HARRISON & J. W. MARTIN.
MACHINE FOR MAKING WIRE AND PICKET FENCING.

No. 299,471. Patented May 27, 1884.

Witnesses.
C. W. Brown
Philip Hawley

Inventors.
Jerome W. Martin
Thomas B. Harrison
By Wallace A. Bartlett
atty.

(No Model.) 7 Sheets—Sheet 6.

T. B. HARRISON & J. W. MARTIN.
MACHINE FOR MAKING WIRE AND PICKET FENCING.

No. 299,471. Patented May 27, 1884.

Witnesses:
C. H. H. Brown.
Philip Hawley.

Inventor.
Jerome W. Martin
Thos. B. Harrison
By H. H. Bartlett
Their atty.

(No Model.) 7 Sheets—Sheet 7.

T. B. HARRISON & J. W. MARTIN.
MACHINE FOR MAKING WIRE AND PICKET FENCING.

No. 299,471. Patented May 27, 1884.

Witnesses.
C. H. H. Brown,
Philip Hawley

Inventor.
Jerome W. Martin
Thos. B. Harrison
By W. A. Bartlett
Their atty

UNITED STATES PATENT OFFICE.

THOMAS B. HARRISON, OF CLINTON, AND JEROME W. MARTIN, OF KIRKSVILLE, MISSOURI.

MACHINE FOR MAKING WIRE-AND-PICKET FENCING.

SPECIFICATION forming part of Letters Patent No. 299,471, dated May 27, 1884.

Application filed March 11, 1884. (No model.)

*To all whom it may concern:*

Be it known that we, THOMAS B. HARRISON, residing at Clinton, in the county of Henry and State of Missouri, and JEROME W. MAR-TIN, of Kirksville, Adair county, Missouri, have invented certain new and useful Improvements in Machines for Making Wire-and-Picket Fencing, of which the following is a specification, reference being had therein to the accompanying drawings.

Our invention relates to machines for making wire-and-picket or wire-and-slat fencing, as hereinafter pointed out.

The invention consists in a jaw mechanism of novel construction whereby the wires are twisted about the slats or pickets; also, in a picket-inserting mechanism whereby the pickets are fed into or between the wires; also, in a beater mechanism by which the pickets are pressed forward, the operation being somewhat similar to that of a lay in a loom; also, in a shifting mechanism by which the movement of the twisting-jaws is reversed with the insertion of each picket; also, in various details of construction, as hereinafter pointed out and claimed.

The object of the invention is to produce a machine in which the entire operation in feeding in and beating up the pickets, winding the completed fencing, and twisting the wires shall be automatic, the only attention required being that of the attendant who feeds the picket to the picket-inserting mechanism.

In the drawings forming part of this specification.

Figures 1, 7, 13:
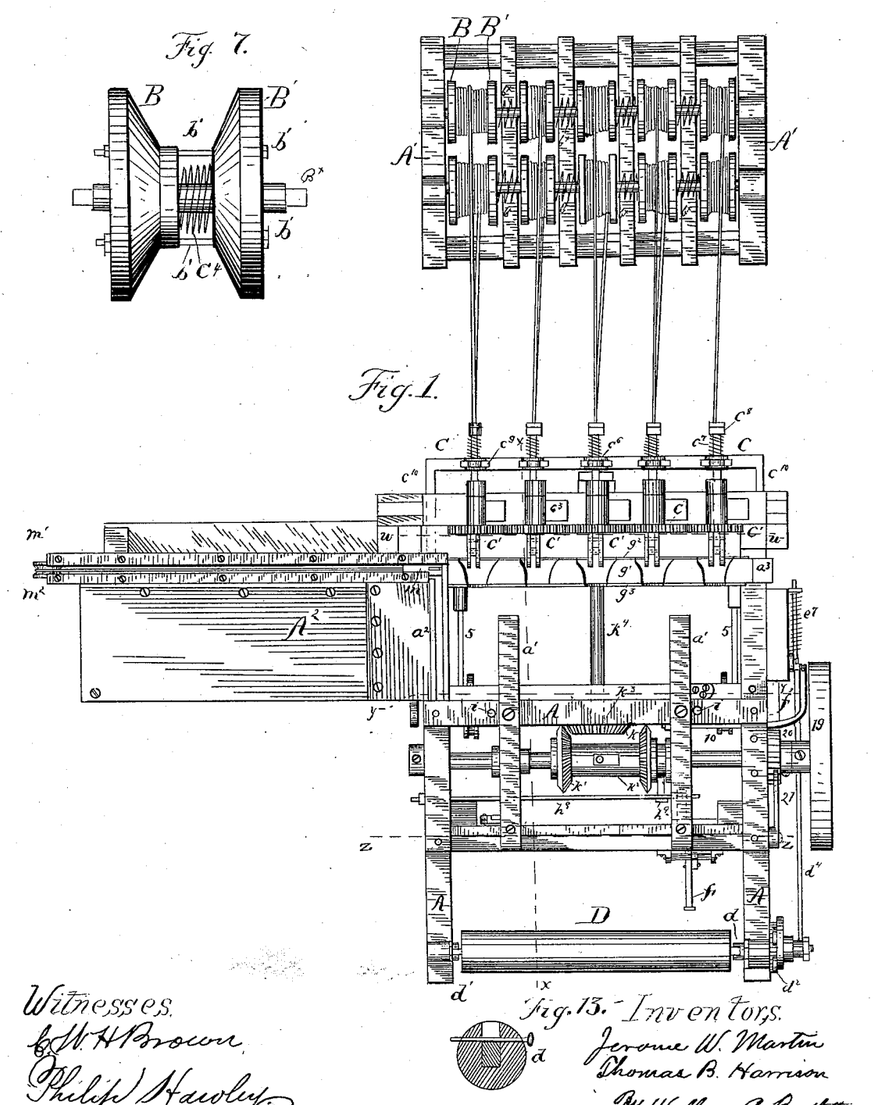
Figure 1 is a plan view of the machine, showing the relative position of the reels to the other mechanism, as well as the various parts which are capable of illustration in said plan view.
Fig. 7 is an elevation of one of the reels.
Fig. 13, a section of the spindle which drives the winding-drum.

A represents the frame of the machine proper, in which the various operating parts of the machine proper are mounted. The reels are carried in a separate frame, A', at the rear of the machine. Each reel is composed of two parts, B B', the parts being held apart by a spring, C⁴, which is capable of compression by the rods $b'$ or other devices which hold the side pieces, B B', together. The reels may be removed separately from the frame, and a roll of wire (such as is common for wire in bulk) can be secured on any of the reels when found necessary. The reels are supported in frame A' on short shafts B$^\times$, and spiral springs $b^\times$ may be placed between adjacent reels surrounding the shafts, to hold the reels apart. The reels may have frusto-conical end pieces, as in Fig. 7, or the ends may be merely disks, Fig. 1. There are two reels of wire for each of the twisting-jaws. The machine illustrated has five sets of jaws; but any convenient number of jaws may be used, and in a machine having five sets of jaws the side ones only may be used, or the side and middle jaws, thus making fence with pickets or slats connected by two or three strands of wire. In such use of the machine the unused reels of wire may be omitted, and the corresponding jaws will run idle.

The twisting-jaws are at the upper rear portion of the machine proper. These jaws are reciprocated backward and forward by draw-rods $c^{10}$, connecting the cross-bar C with the beater-head.

Figure 8:
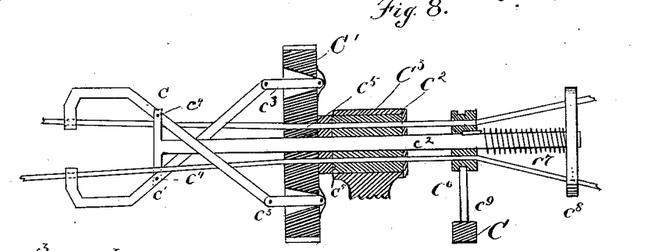
Fig. 8 is a view mainly in longitudinal section of one of the twisting-jaw mechanisms.

The twisting-jaw mechanism consists of a series of jaws, $c$ $c'$, which are pivoted to a sliding spindle, $c^2$, by a pin or similar pivot passing through the jaws and spindle at $c^4$ $c^4$. The front end of each jaw is perforated for the passage of the wire. The rear end of the jaw is pivoted to a link, $c^5$, which is pivoted to suitable supports on the driving-wheel C'. The spindle $c^2$ is polygonal or splined, and the aperture through which it passes in wheel C' is of similar shape, so that the spindle will be turned by the wheel, but will be free to slide lengthwise through the same. Wheel C' has an extended hub, $C^2$, which is hung in the bearings $C^3$. The hub and wheel are perforated at $c^5$ $c^5$ for the passage of the wires. A grooved pulley, $c^6$, secured to the spindle $c^2$, is engaged by yoke or fork $c^9$ to move the spindle lengthwise. Behind said spindle a spring, $c^7$, serves to press back the spreader $c^8$; but said spreader may slide forward on the spindle by compressing the spring. When spindle $c^2$ is drawn forward, the effect will be to move the jaws forward and close them nearly together. As the spindle moves back, the jaws are opened. The rotation of wheel C' serves to rotate the jaws, and thus twist the wires together just in front of the jaws. An equal twist of the wires in reverse direction is made behind the spreader $c^8$; but as the spreader will yield somewhat to the wires, and as the distance from the spreader to the reels is considerable, this twist does not become so compact as to prevent the drawing forward and separation of the wires; and as each alternate picket is secured by a twist in reverse direction, the twist of the wires back of the spreader is taken out with alternate movements of the jaw and beater. The yokes or forks $c^9$ are sustained by a bar, C, which partakes of the movement of the beater, so that the jaws are closed at the proper time to draw the wires firmly around the pickets, and the twist is then applied to the wire.

The reversing-gear by which the movement of the jaws is controlled will be now described.

Figures 5, 12:
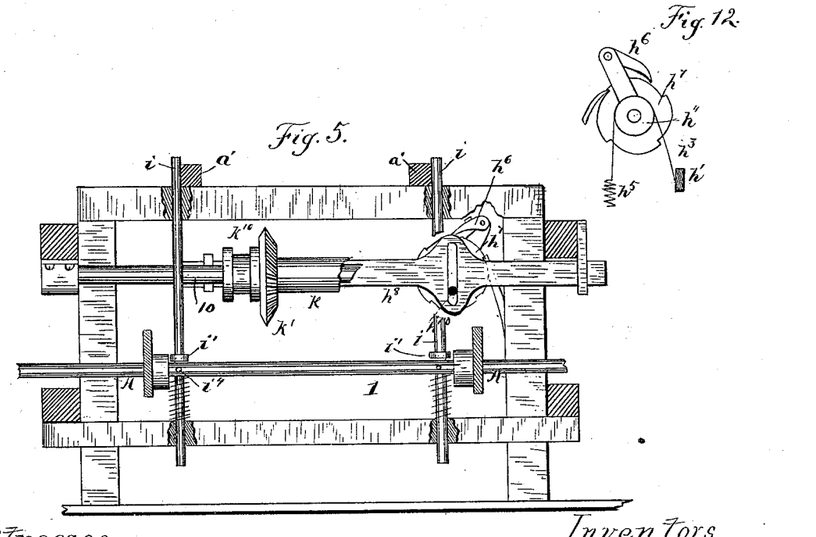
Fig. 5 is a partial cross-section on the line $yy$, Fig. 1, looking toward the front of the machine—that is, the part carrying the winding mechanism.
Fig. 12, a detail of part of the reversing-gear mechanism.

A cam, $h$, on the shaft 10 serves by its rotation to depress lever $h'$, which is pivoted at $h^2$ to the frame or a hanger therefrom. The other end of the lever $h'$ has a cord, $h^3$, attached, which cord is attached to a pulley, $h^4$, and when the lever is depressed serves to rock said pulley against the force of spring $h^5$, which is attached to the pulley in reverse direction. The pulley $h^4$ carries a spring-pawl, $h^6$, which engages teeth on the ratchet-wheel $h^7$, and serves to rotate the same with a step-by-step movement. Said ratchet-wheel has a wrist-pin, $h^{10}$, on its flat face, which pin moves in a slot in the slide-bar $h^8$. Thus when the ratchet-wheel moves the slide-bar $h^8$ will have a reciprocating movement imparted to it. A pin, $h^9$, Fig. 1, projects from said slide-bar into a groove, $k^{10}$, in the sleeve $k$. Sleeve $k$ is made to turn with shaft 10 by a pin-and-slot connection, but may be moved lengthwise of said shaft. Bevel-gears $k'$ $k^2$ at the ends of said sleeve may be thrown alternately into engagement with bevel-gear $k^3$ by the shifting of the sleeve, and when the sleeve is in intermediate position both these gears are thrown out, and wheel $k^3$ will not be moved by the rotation of shaft 10. (See Fig. 1.) The wheel $k^3$ is fixed to shaft $k^4$, which bears the large gear-wheel $k^5$. This gear-wheel engages the teeth of one of the gears C', and as all the gears C' intermesh with each other the gears are all put in motion whenever the bevel-gears $k'$ or $k^2$ are in engagement with $k^3$. The shaft $k^4$ has an arm, $k^6$, which comes in contact with a stop, $k^7$, when the shaft has made a complete revolution, so that the movement of the gear-wheel $k^5$ is never more than a complete revolution, and the amount of twist of the wires by the twisting-jaws imparted by gears C' is uniform. The stop $k^7$ is permitted to slide a little in either direction, so that the arm $k^6$ may be stopped in the same place, whether the arm approaches it from the right or left.

Figure 2:
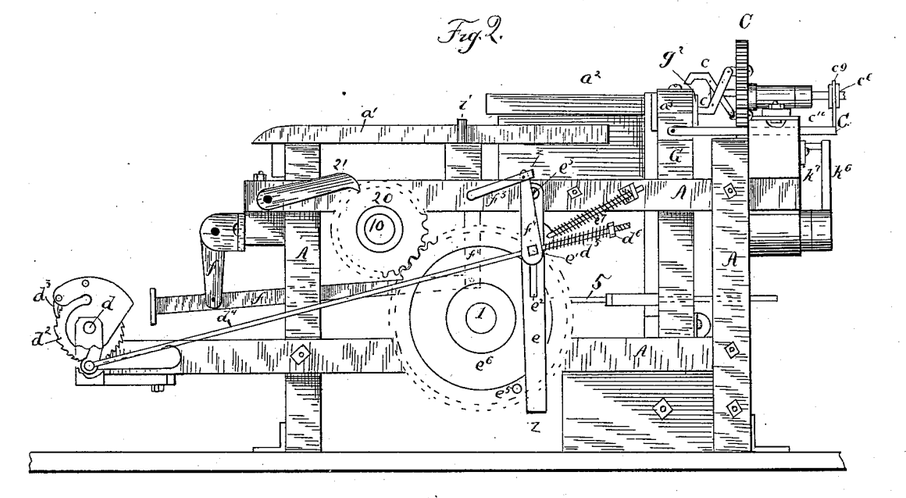
Fig. 2 is a side elevation, the driving-wheel being removed, the better to show details.
Figure 9:
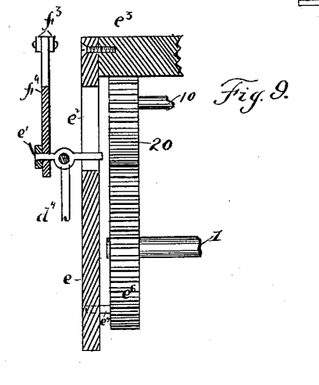
Fig. 9 is an enlarged section on line $z\ z$ of part of the winding-drum-operating mechanism.
Figure 10:
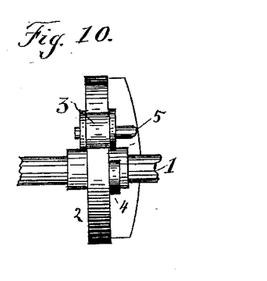
Fig. 10 is a detail of part of the beater-operating mechanism.

The movement of the machine is timed so that the jaws begin to close and twist the wires as soon as the picket is thrown into position between said wires, as hereinafter explained. The wires carried through the jaw mechanism are led forward over the top of the machine, and wind on the winding-drum D, the wires resembling the warp in a loom. The winding-drum D has squared pintles at each end, which are held in polygonal sockets in spindles $d$ $d'$, and may be secured in such sockets by pins, as shown in the detail, Fig. 13. The drum D may be removed from the spindles $d$ $d'$ whenever necessary. The spindle $d$ is rotated to wind up the woven fencing on the drum by the ratchet $d^2$. A pawl, $d^3$, engages this ratchet. The pawl is operated by draw-rod $d^4$, which extends from the ratchet-carrying mechanism to the swinging lever $e$, Figs. 2 and 9, and is connected to said lever by a pin, $e'$, extending into a slot, $e^2$, in said lever. The lever $e$ is pivoted at $e^3$ to the frame A, and is rocked in one direction by engagement with pin $e^5$ on gear-wheel $e^6$ on the shaft 1. The lever $e$ is rocked in reverse direction by the spring $e^7$, which bears against said lever. The draw-rod $d^4$ has a relieving-spring, $d^5$, beyond its connection with the pin $e'$, and a nut, $d^6$, serves to regulate the tension of said spring.

A push-bar, $f$, sustained by link $f'$, extends into proximity with the drum D. As the roll of fencing increases in size, this push-bar is pressed back by the periphery of the roll of fencing bearing against the end of the bar, and in its backward movement rocks the bar $f^2$, which turns the rocker-arm $f^3$, to which the link $f^4$ is attached. This link lifts the pin $e'$ in the slot $e^2$ as it rises, and thus shortens the throw of rod $d^4$, and by this means lessens the speed with which the winding-drum is rotated in proportion as the roll thereon grows larger.

Figure 4:
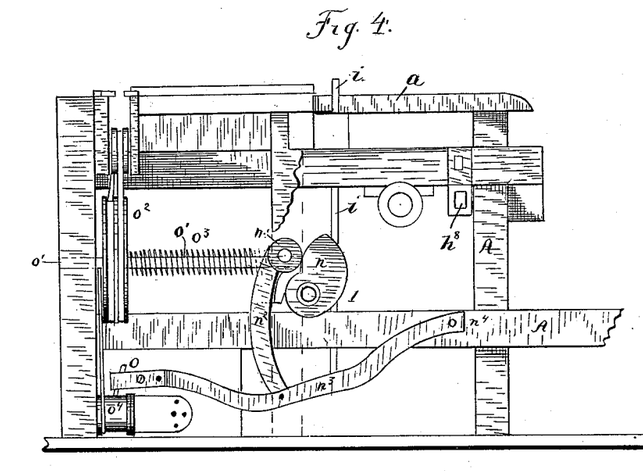
Fig. 4 is a view partly in elevation and partly sectional of the reverse side of the machine, the reels and winding-drum being omitted.
Figure 6:
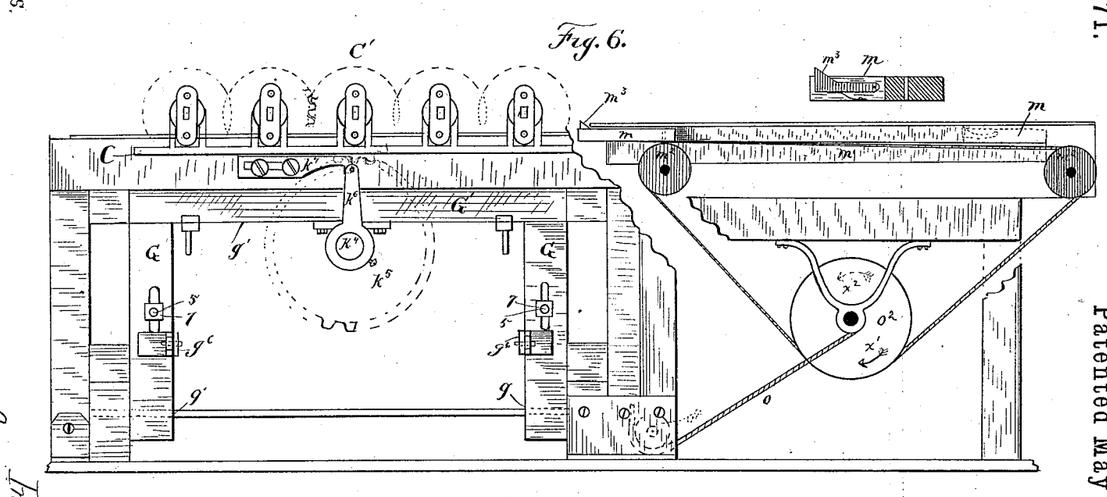
Fig. 6 is a rear elevation of the machine, the reels being omitted.
Figure 11:
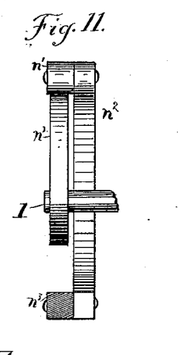
Fig. 11 is a detail showing part of the shuttle mechanism.
Figure 14:
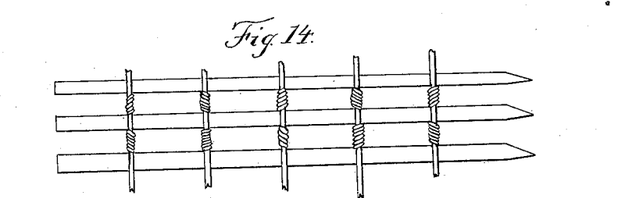
Figs. 14 and 15 are views of the wire-and-picket fencing.
Figure 15:
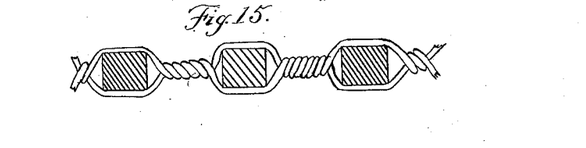
Figure 16:
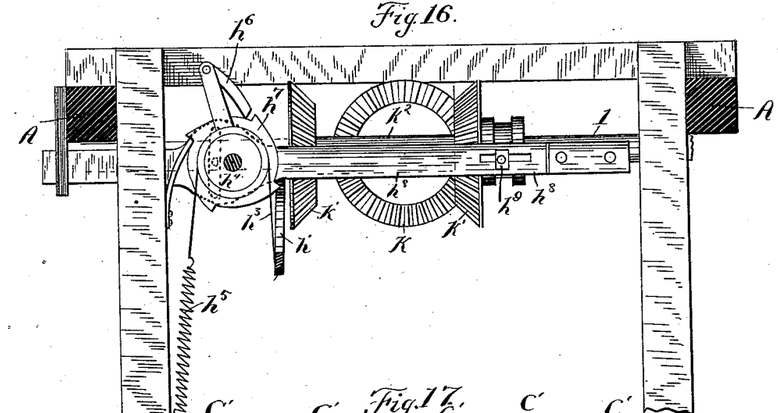
Fig. 16 is a section on line $z\ z$ of Fig. 1.
Figure 17:
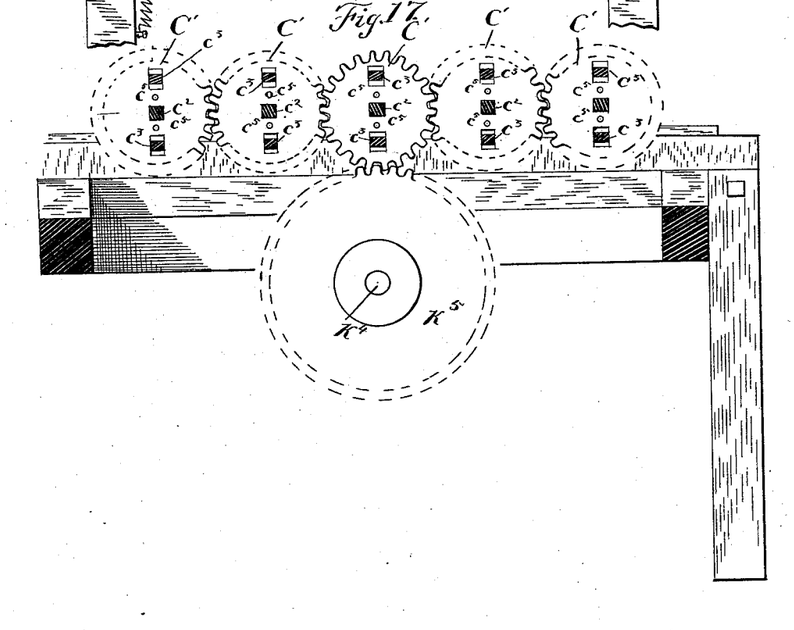
Fig. 17 is a section on line $w\ w$ of Fig. 1.

The picket-inserter $m$ is drawn back by means of the train of mechanism shown in Figs. 4, 6, and 11. A cam, $n$, on shaft 1 bears in its rotation against anti-friction wheel $n'$, which is carried by arm $n^2$ of lever $n^3$. Lever $n^3$ is pivoted to frame A at $n^4$, and at its other end is attached to cord $o$. By this connection, when cam $n$ revolves, it will raise the lever $n^3$ through its connections, and so draw on the cord or wire $o$. The cord $o$ is attached at one end to the short shaft $o'$, which bears the wheel $o^2$, and is surrounded by coiled spring $o^3$, which tends to rotate the shaft in one direction. The cord $o$ passes round said shaft, or a pulley thereon, a few times, and thence round a pulley, $o^4$, to the lever $n^3$, as before explained. The lifting of said lever thus draws on the cord and winds up the spring $o^3$. An endless belt, $m'$, passes round wheel $o^2$ and pulleys $m^2$ $m^2$, and is attached to picket-inserter $m$. This belt is driven in one direction by the rotation of the wheel $o^2$ by means of a pull on cord $o$, as before described. This rotation (in the direction of the arrow $x'$) will draw the picket-inserter $m$ back into the position shown in dotted lines in Fig. 6. When the end of the cam $n$ releases the lever $n^3$ through its connections, the spring $o^3$ reverses the movement of wheel $o^2$, driving it in the direction of the arrow $x^2$, and by this means suddenly propelling the picket-inserter from the position shown in dotted lines to that shown in full lines, Fig. 6. This movement of the picket-inserter carries a picket with it between the wires and upon or above the beater.

The picket-inserter $m$ has a spring or gravity finger, $m^3$, which will readily pass backward under a picket; but when thrown forward by the spring and its mechanism the finger rises and forces the picket forward with it. The pickets are placed on the table $A^2$ and fed to the picket-inserter singly by hand, the movement of the shuttle, as well as all other movements of the machine, being timed automatically, so that all the parts work in uniformity.

Figure 3:
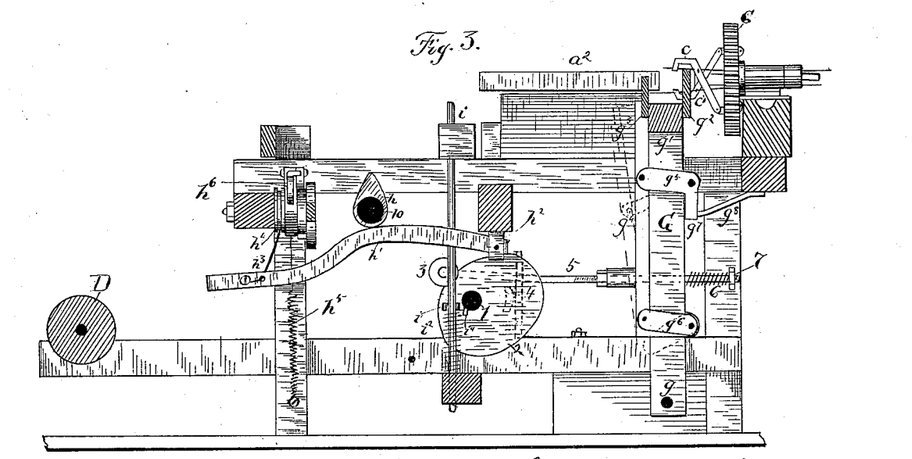
Fig. 3 is a vertical longitudinal section of the machine on line $x\ x$ of Fig. 1, looking in the same direction as in Fig. 2.
Figures 18, 19, 20:
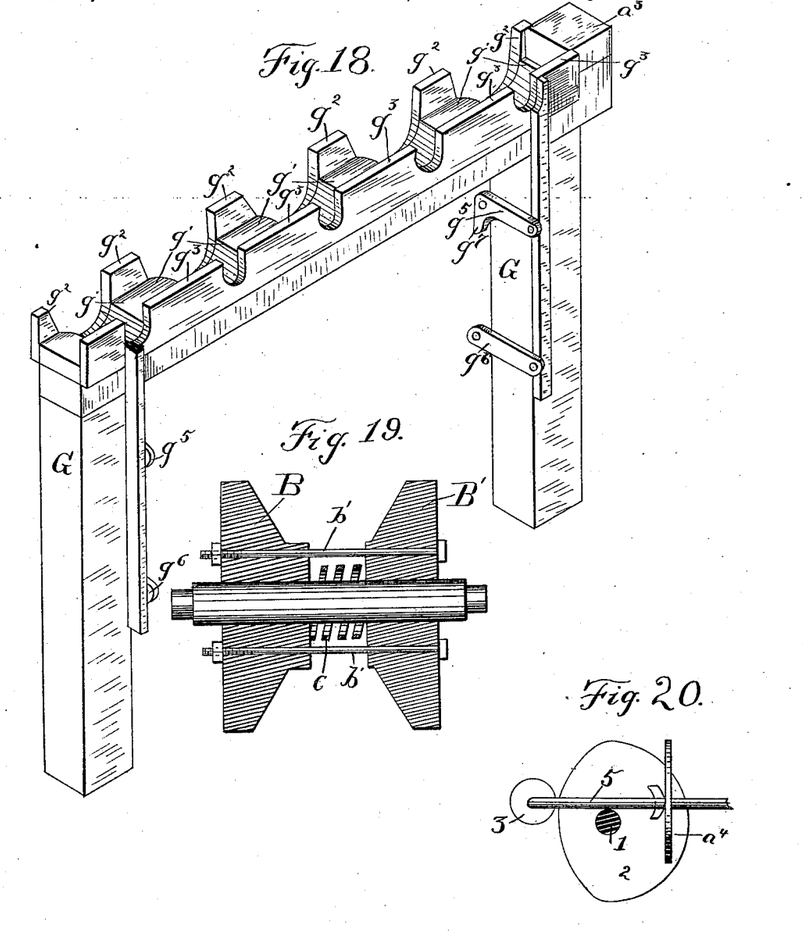
Fig. 18 is a detail perspective of the beater.
Fig. 19 is a longitudinal section of one of the reels.
Fig. 20 is a detail of the beater-operating cam.

The beater G has a movement similar to the lay of a loom. The body of the beater is composed of two standards, which are pivoted at $g$, and a cross-bar, $g'$, at the top. This cross-bar, when swung back, is directly under the front ends of the jaws, and is in line with the track of the shuttle $m$, so that when the picket-inserter slides a picket into the wires the picket is directly above the bar $g'$. At the rear of bar $g'$ there is a notched plate, $g^2$, into the notches of which the jaws extend, the projections extending up between the jaws. This plate $g^2$ is firmly secured to the cross-bar $g'$. At the front of bar $g'$ is a sliding plate, $g^3$, which is secured to bars $g^4$. These bars $g^4$ are hung on links $g^5$ and $g^6$. Link $g^5$ is a bell-crank lever, which has an arm, $g^7$, which engages a stop, $g^8$, when the beater swings back, and so lifts bars $g^4$ and notched plates $g^3$. When the beater swings forward, these plates fall by their own weight as arm $g^7$ moves away from stop $g^8$. The beater is swung back and forth by cams 2 on shaft 1, which cams engage with projections 3 and 4 on draw-bars 5. These draw-bars 5 pass through the upright standards of the beater G, and have relieving-springs 6 applied behind the standards. The tension of these springs may be regulated by nuts 7, and the power of the cams is applied to draw the beater forward through these springs. Should the resistance be too great, as when a wide picket is fed in, the springs will give and prevent accident to the machine. At the same time a uniform pressure is exerted by the "beater." The beater mechanism, when moved back, lies under the wires, which are spread apart, like the warp-threads in a loom before the throw of a shuttle. (See Fig. 3.) When the picket is thrown by the picket-inserter between the wires, it is guided in its movement by the notched plates $g^2$ $g^3$. As the beater moves forward to press the picket firmly against the wires before twisted, the plate $g^3$ falls, as before explained. The jaws $c$ $c'$ partake, to some extent, of the movement of the beater, following up the picket, and at the same time twisting the two wires firmly together. With a reverse movement of the beater the jaws are drawn back, their rotation having been stopped, and they are ready to apply the wires to the next picket.

Two sliding stops, $i$ $i$, are placed in the path of movement of the fencing as the same slides over the rests $a'$. These stops are normally held up by springs $i^2$, but are drawn down by pins or cams $i^4$ on shaft 1, coming in contact with nuts or projections $i'$ on said sliding stops. The movement of the stops is so regulated as to hold the completed fencing against forward movement while the beater is pressing the last-inserted picket home, but to permit the winding of the fencing on the drum D at the proper time.

A stop, $a^2$, at the end of the table serves as an evener for the ends of the pickets, and a stop, $a^3$, at the end of the beater limits the movement of the pickets when thrown by the picket-inserter.

The shaft 10, which is the main driving-shaft, is driven by hand-wheel 19. The gear 20 communicates motion to gear $e^6$, and is prevented from moving backward by pawl 21.

The wires from the reels are led through the jaws and forward to the winding-drum before the operation of inserting the pickets begins. The first picket may be held by hand until a length of fencing has been completed sufficient to reach the stops $i$. Continuous lengths of fencing may thereafter be made, the wires being cut and a drum detached whenever found desirable, a new winding-drum taking the place of the old one.

We claim—

1. The combination, with the picket-inserter $m$, having spring-finger $m^3$, of the operating-cam, the lever, arranged, as described, to be moved by said cam, the cord attached to said lever and leading to the spring-bearing shaft, the spring for driving said shaft, and the endless belt and its driving-pulley, actuated by said spring to move the picket-inserter forward, all relatively arranged substantially as described.

2. The combination, with the beater G, of the sliding guard-plate $g^3$, and mechanism, substantially as described, whereby the guard-plate is raised or lowered with the movement of the beater.

3. The combination, with the swinging beater G, of the sliding plate $g^3$, bars $g^4$, supporting the same, links supporting said bars and pivoted to the beater-standards, and a lever and stop, arranged substantially as described, whereby the bars and plate are raised as the beater moves back, and permitted to fall as the beater moves forward.

4. The combination, with the sliding stops $i\,i$, of the swinging beater G, and mechanism, substantially as described, whereby the stops are held up while the beater swings forward, and depressed to permit the winding of the fencing, substantially as described.

5. The combination, with the shifting sleeve on the driving-shaft, a shaft and gears driven thereby alternately in one or the other direction, and the twisting-jaws driven from said shaft, of an arm on the shaft, and a sliding piece, $k^7$, bearing a stop which said arm engages alternately, substantially as described.

6. In a wire-and-picket-fence machine, and in combination with the picket-inserter and beater mechanism thereof, a series of wire-twisting jaws, and mechanism, substantially as described, whereby the jaws are closed to twist the wire in close proximity to the picket, as set forth.

7. The combination, with a series of rotating jaws, connected together so as to rotate in unison, of mechanism, substantially as described, whereby the jaws are opened or closed during the rotation, as set forth.

8. The combination, with the rotating gear C', of jaws $c\,c'$, connected to said gear by pivoted links, and a spindle connected to the pivot of the jaws, whereby the jaws may be expanded and contracted by the movement of the spindle during the rotation of the gear.

9. The series of gears C', arranged for uniform rotation, substantially as described, expansible jaws carried by said gears, the spindles connected to said jaws, and connections, substantially as described, whereby all the spindles may be advanced or retracted together, as set forth.

10. In combination with a rotating spindle of wire-twisting jaws, a yielding spreader carried by said spindle, having perforations through which the wires pass.

11. The combination, with the pivoted jaws and the spindle connected to the pivot thereof, of a spreader mounted on said spindle, and a spring against which spreader bears, substantially as set forth.

In testimony whereof we affix our signatures in presence of two witnesses.

THOS. B. HARRISON.
JEROME W. MARTIN.

Witnesses to signature of Thos. B. Harrison:
ALEX. N. HOIG,
SAMUEL J. SEIFRIED.

Witnesses to signature of Jerome W. Martin:
WILLIAM F. LINK,
WILLIS D. OLDHAM.